United States Patent
Graf et al.

[11] Patent Number: 6,136,257
[45] Date of Patent: Oct. 24, 2000

[54] APPARATUS AND METHOD FOR PRODUCING A THREE-DIMENSIONAL OBJECT AND FOR APPLYING A LAYER OF A POWDER MATERIAL TO A SURFACE

[75] Inventors: Bernhard Graf, Schondorf; Thomas Mattes, Germering; Lutz Reichmann, Jena, all of Germany

[73] Assignee: EOS GmbH Electro Optical Systems, Planegg, Germany

[21] Appl. No.: 09/270,717

[22] Filed: Mar. 17, 1999

[30] Foreign Application Priority Data

Mar. 27, 1998 [DE] Germany .............................. 198 13 742

[51] Int. Cl.⁷ .............................. B05D 7/00; B29C 35/08; B29C 41/02; B29C 67/00
[52] U.S. Cl. .......................... 264/460; 118/308; 264/484; 264/497; 425/145; 425/174.4; 425/174.8 E; 427/193
[58] Field of Search .................................... 264/460, 484, 264/497; 425/145, 174.4, 174.8 E; 427/193; 118/308

[56] References Cited

U.S. PATENT DOCUMENTS

| | | | |
|---|---|---|---|
| 2,197,878 | 4/1940 | Robinson | 118/308 X |
| 3,660,547 | 5/1972 | Ruekberg | 264/484 X |
| 4,550,680 | 11/1985 | Derendinger | 118/308 |
| 4,863,538 | 9/1989 | Deckard . | |

FOREIGN PATENT DOCUMENTS

| | | |
|---|---|---|
| 0 416 852 A2 | 3/1991 | European Pat. Off. . |
| 5-139543 | 6/1993 | Japan . |
| 8-502703 | 3/1996 | Japan . |
| 8-309864 | 11/1996 | Japan . |
| 9-201877 | 8/1997 | Japan . |
| 2 000 990 | 1/1979 | United Kingdom . |
| 2 014 194 | 8/1979 | United Kingdom . |
| WO 95/18715 | 7/1995 | WIPO . |

*Primary Examiner*—Leo B. Tentoni
*Attorney, Agent, or Firm*—Dike, Bronstein, Roberts & Cushman, LLP; George W. Neuner

[57] ABSTRACT

An apparatus is described for producing a three-dimensional object from a powder material which includes powder particles and which is solidifiable by exposure to electromagnetic radiation. The apparatus includes a support having a substantially plane support surface for supporting said object, an applying device for applying a layer of the powder material to the support surface, a radiation device for selectively exposing the powder material to electromagnetic radiation at places corresponding to the object and a discharge electrode for generating an electric field for reducing charge differences on the powder particles.

15 Claims, 2 Drawing Sheets

APPARATUS AND METHOD FOR PRODUCING A THREE-DIMENSIONAL OBJECT AND FOR APPLYING A LAYER OF A POWDER MATERIAL TO A SURFACE

BACKGROUND OF THE INVENTION

The invention relates to an apparatus for producing a three-dimensional object from a powder material which comprises powder particles and is solidifiable by electromagnetic radiation, comprising support means having a substantially plane support surface for supporting said object, means for applying a layer of said powder material to said support surface and radiation means for selectively exposing said material to electromagnetic radiation at places corresponding to said object. The invention further relates to a method of layerwise producing a three-dimensional object by generating a layer of such a powder material, and solidifying said layer by selective exposure to electromagnetic radiation at places corresponding to said object. The invention further relates to an apparatus for applying a layer of such a powder material to a substantially plane surface comprising a receptacle for said powder material, said receptacle being disposed above said surface and having a bottom side facing said surface, an outlet aperture having an aperture width provided in said bottom side and means for displacing said receptacle across said surface and substantially parallel thereto.

An apparatus and a method for producing a three-dimensional object by selective laser sintering is disclosed for example in U.S. Pat. No. 4,863,538. A predetermined amount of powder material is dumped onto a lowerable base and equally distributed thereon by means of a roller travelling across the base while rotating in a direction opposite to the travelling direction. Thereafter the distributed material is exposed to radiation at those places of the formed material layer which correspond to the object whereby the material is sintered or baked together thereat.

WO 95/18715 discloses an apparatus and a method for producing a three-dimensional object as above defined and likewise an apparatus for applying a layer of a powder material to a substantially plane surface as inicially defined. The applying or coating device disclosed in WO 95/18715 has a wide lower outlet aperture. This gives rise to the problem that the dead weight of the powder discharged from the powder receptacle generates forces acting on presolidified sintered portions in the production area and causing a displacement thereof within the powder bed. To prevent this effect the sintered portions must be tied to the construction base, for example using a support structure (support) which is not part of the object to be formed and must be removed at the end of the production process. This increases the production time and reduces production quality. Moreover, the production of the support requires time.

OBJECTS OF THE INVENTION

It is an object of the invention to provide an improved apparatus and method for producing a three-dimensional object, as well as an improved apparatus for applying a layer of a powder material to a substantially plane surface. It is a further object of the invention to improve the known apparatus and methods to reduce object production time and increase object production quality.

SUMMARY OF THE INVENTION

In order to achieve the above-mentioned objects the invention provides an apparatus for producing a three-dimensional object from a powder material, said material comprising powder particles and being solidifiable by exposure to electromagnetic radiation, said apparatus comprising support means having a substantially plane support surface for supporting said object, means for applying a layer of said powder material to said support surface, radiation means for selectively exposing said powder material to electromagnetic radiation at places corresponding to said object and means for generating a field for reducing charge differences on said powder particles.

The invention further provides an apparatus for applying a layer of a powder material to a substantially plane surface, said apparatus comprising a receptacle for said powder material, said receptacle being disposed above said surface and having a bottom side facing said surface, an outlet aperture provided in said bottom side and having an aperture width, means for displacing said receptacle across said surface and substantially parallel thereto and means for adjusting said aperture width of said outlet aperture. According to an important aspect of the invention this apparatus for applying a layer of a powder material is used in an apparatus for producing a three-dimensional object further comprising support means having a substantially plane support surface for supporting said object and radiation means for selectively exposing said powder material to electromagnetic radiation at places corresponding said object after having applied said layer of powder material.

The invention further provides an apparatus for applying a layer of a powder material to a substantially plane surface, the apparatus comprising a receptacle for said powder material, said receptacle being disposed above said surface and having a bottom side facing said surface, an outlet aperture provided in said bottom side, said outlet aperture having an aperture width which is less than 10 times the average particle diameter of the powder material, and means for displacing said receptacle across said surface and substantially parallel thereto.

According to a still further aspect the invention provides a method of layerwise producing a three-dimensional object, the method comprising a generating a layer of a powder material which comprises powder particles and is solidifiable by exposure to electromagnetic radiation, solidifying said layer by selective exposure to electromagnetic radiation at places corresponding to said object and generating an electric field for reducing charge differences between said powder particles.

BRIEF DESCRIPTION OF THE DRAWINGS

Further advantages, features and objects of the invention will be apparent from the description of embodiments with reference to the drawings, wherein.

DESCRIPTION OF PREFERRED EMBODIMENTS

Figure 1:
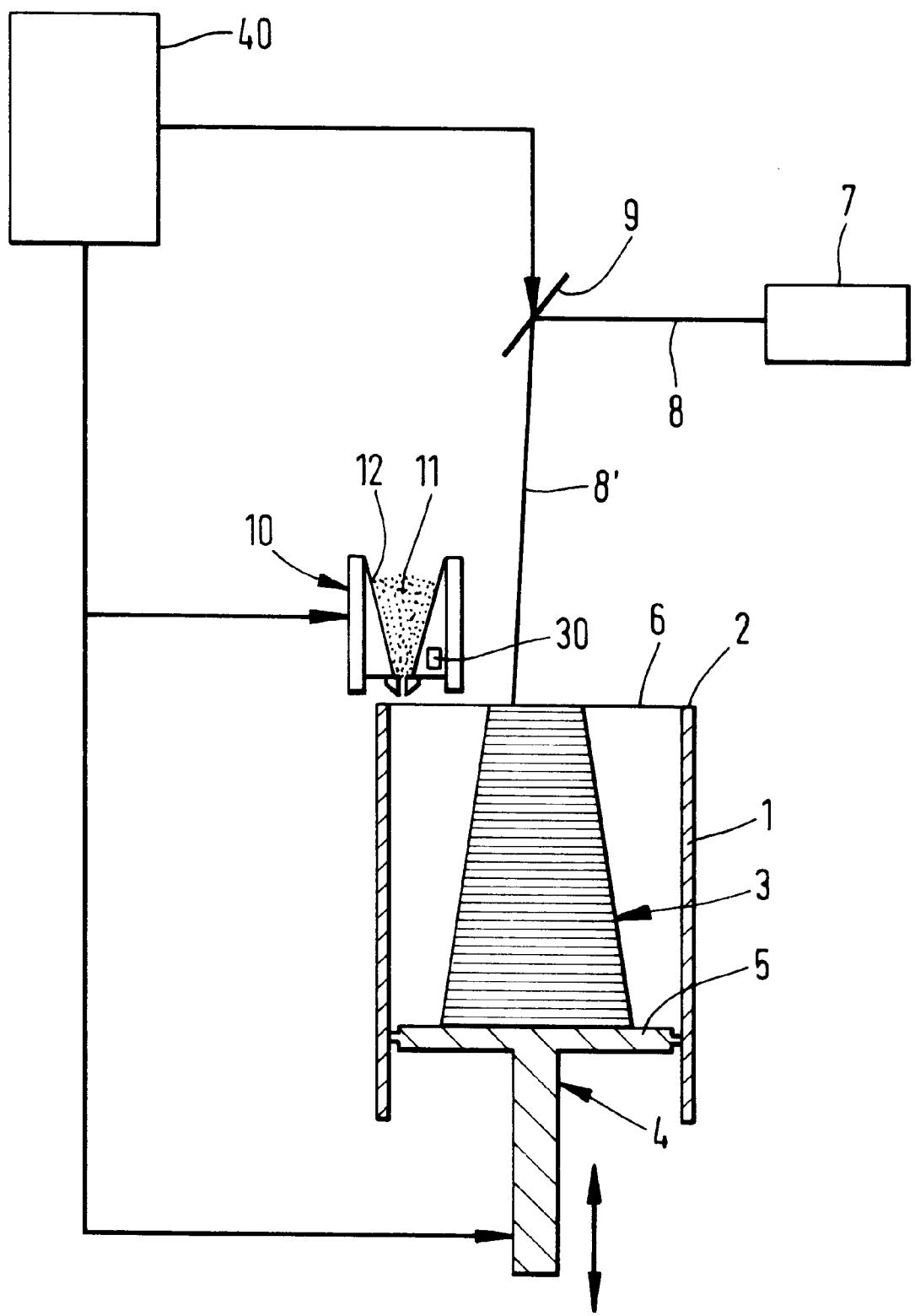
FIG. 1 is a section through the inventive apparatus in schematic representation.

As shown in particular in FIG. 1 the apparatus for producing a three-dimensional object comprises a container 1 having open bottom and top sides, a circular, square or rectangular cross-section and an upper border 2. The cross-section of the container 1 is greater than the greatest cross-sectional area of an object 3 to be produced. The container 1 houses a support 4 for supporting the object to be produced, the support 4 having a substantially plane upper surface 5 directed towards the upper border 2. A drive means is schematically indicated in FIG. 4 for vertically lifting and lowering the support 4 within the container 1 and precisely adjusting the position of the support 4 within the container 1. The upper border 2 of the container defines the working plane 6. A radiation device delivering a focused light beam 8, for example a laser 7, is disposed above the working plane 6. A deflector 9, for example a rotating mirror, deflects the focused light beam 8 to a deflected beam 8' towards the working plane 6.

An applying device 10 for applying a powder material 11 onto the support surface 5 or a previously solidified layer for solidification comprises a receptacle 12 (shown in detail in FIG. 2) formed as an elongated hopper extending transversely across the area defined by the upper border 2 of the container 1. The receptacle 12 comprises two spaced parallel and vertically extending sidewalls 13, 14. The cross-section of the container between the sidewalls 13, 14 is substantially V-shaped and defined by two mutually inclined sidewalls 15, 16 such that the cross-section diminishes downwards, i.e. in direction towards the upper border 2 of the container 1. The sidewalls 15, 16 of the hopper-shaped receptacle 12 both comprise, at their lower end adjacent to the upper border 2 of the container 1, a respective blade 14, 18, the spacing of the blades 17, 18 defining a narrow outlet aperture in the form of an outlet slot 19 for discharging the powder material 11 from the receptacle 12. The width of the outlet slot 19 is adjusted by adjusting the spacing between the sidewalls 15, 16. The blades 17, 18 can be formed unitary with the corresponding sidewall 15, 16. The slot width of the outlet slot is for example about 1 mm with a grain size of a powder material of about 0.2 mm. The powder receptacle 12 has an open top for filling powder material therein. The outlet slot 19 and the upper aperture 20 of the receptacle both extend over substantially the entire length of the receptacle 12 whereby the entire receptacle is constituted by a downwardly tapering hopper having a length corresponding substantially to the diameter of the upper border 2 of the container 1 or of the support surface 5, respectively.

The applying device 10 is movable from a first end position on one side of the container 1 to a second end position on the opposite side of the container 1 and back across the container by means of a (not shown) driving device.

Figure 2:
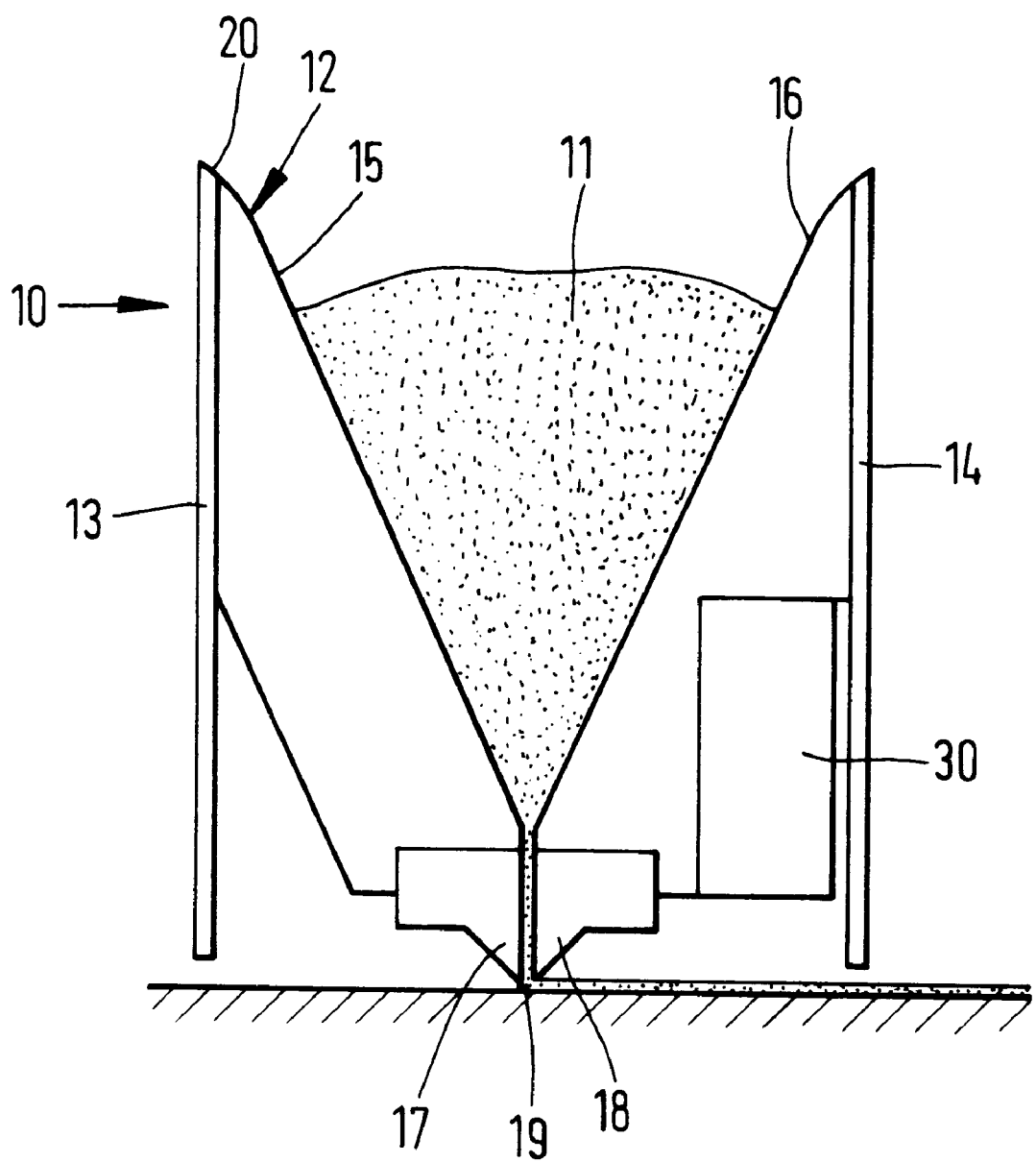
FIG. 2 is a section through the apparatus for applying a layer of powder material according to the invention, likewise in schematic representation.

As shown in particular in FIG. 2 a discharge electrode 30 for generating an electric field is arranged at one end of a sidewall 16 of the receptacle 12 adjacent to the outer sidewall 14. The discharge electrode 30 is mounted at a lower region of the sidewall 16 facing the working plane 6 and close to the outlet slot 19. The discharge electrode serves the purpose of generating a strong electric field for producing ions within the atmosphere surrounding the apparatus. The discharge electrode 30 is designed to be brought to a potential of between about +5 kV and −5 kV. Since the discharge electrode 30 is secured to the receptacle 12 it moves together therewith back and fourth over the surface of the layer to be solidified.

The driving devices for adjusting the level of the support 4, for moving the applying device 10 over the container 1 and for adjusting the deflector 9 are controlled in a coordinated manner by a central control device 40.

In operation, before starting the entire apparatus, the spacing of the blades 17, 18 is initially adjusted to be suitable for the powder material used. The powder material may be a resin, metal or ceramic powder or a sand coated with phenolic resin or any other thermoplastic resin, so-called molding sand. Before starting the production process the receptacle 12 is filled with the powder material 11. Thereafter the support 4 is raised by means of the lifting device into its uppermost position wherein the support surface 5 is below the upper border 2 by a distance corresponding to the layer thickness of the first layer to be applied. Thereafter the applying or coating device 10 is made to travel over the working plane 6 by the corresponding driving device, whereby the powder material is discharged through the outlet slot 19 and forms the first layer. The laser 7 is then switched on and the control device 40 controls the deflector 9 in such a manner that the deflected light beam impinges successively on all desired places of the layer, i.e. the places corresponding to the object at this layer, and solidifies the powder material threat by sintering.

In a second step the support surface is lowered by an amount corresponding to the thickness of the next layer, again a layer of powder material is applied and the step of exposing the layer to radiation at the places corresponding to the cross-section of the object in this layer is repeated. Thereafter these steps are repeated until the object is finished.

Owing to the narrowness of the slot 19 the powder material 11 to be applied when forming a layer supports itself at the sidewalls 15, 16 of the coating receptacle 12 and therefore hardly exerts any force onto the powder bed lying below the coating device and having the previously formed sintered portions therein. To realize the narrow outlet slot 19 of the applying device it is preferable to reduce or eliminate the amount of electrostatic charge in the powder material bed which necessarily results from friction when using certain materials for applying new layers to prevent clogging of the outlet slot 19 by adhering charged particles. This is accomplished by activating, during the entire production process, the discharge electrode 30 which is mounted to the applying device 10 and generates a strong electric field to produce ions in the surrounding atmosphere which are then available for reducing the charge differences between the powder particles. Mounting the discharge electrode directly at the applying device close to the outlet slot ensures that the entire surface of the powder within the container 1 is discharged and no agglomerates of charged particles adhere to the applying device and clog the outlet slot 19. A continuous flow of powder particles is therefore obtained.

Modifications of the apparatus are possible. For example, a respective discharge electrode can be provided at each of two opposite ends of a sidewall of the receptacle for uniformly ionizing the surrounding atmosphere over the width of the working area. The discharge electrode 30 can be realized in the form of two capacitor plates arranged at opposite sides of the container 1 for generating an electric field in the entire production area. Either a stationary electric field or an alternating electric field may be generated. In case that the powder material used is not or only slightly charged the discharge electrode may under circumstances be dispensed with and only the inventive applying device having a narrow outlet slot may be used. The applying device 10 can be additionally provided with wiper members. Rather than adjusting the slot width by adjusting the blades, the blades may be secured to the sidewalls and the slot width may be adjusted by displacing the entire sidewalls relative to each other. It is also possible to provide replaceable applying devices each having a fixed predetermined slot width. It is further possible to omit the straight sidewalls 13, 14.

Although the invention has been described with reference to specific example embodiments, it is to be understood that it is intended to cover all modifications and equivalents within the spirit and scope of the appended claims.

What is claimed is:

1. Apparatus for producing a three-dimensional object from a powder material comprising powder particles and being solidifiable by exposure to electromagnetic radiation, said apparatus comprising support means having a substantially plane support surface for supporting said object, means for applying a layer of said powder material to said support surface, radiation means for selectively exposing said material to electromagnetic radiation at places corresponding to said object and means for generating an electric field for reducing charge differences on said powder particles.

2. The apparatus of claim 1, said generating means comprising a discharge electrode.

3. The apparatus of claim 1, said generating means being mounted to said applying means.

4. The apparatus of claim 1, said generating means comprising means for generating a stationary electric field.

5. The apparatus of claim 1, said generating means generating an alternating electric field.

6. The apparatus of claim 1, said applying means comprising an applying device and means for moving said applying device over said support surface.

7. The apparatus of claims 6, said applying device comprising a hopper having a V-shaped cross-section tapering towards said support surface.

8. The apparatus of claim 6, said applying device comprising an outlet aperture extending transversely across said surface and means for adjusting the width of said outlet aperture.

9. The apparatus of claim 8, wherein said outlet aperture is formed as a gap or slot.

10. The apparatus of claim 8, wherein said outlet aperture is formed by two spaced blades mounted to the applying device and means are provided for adjusting the spacing of the blades.

11. Apparatus for producing a three-dimensional object from a powder material comprising powder particles and being solidifiable by exposure to electromagnetic radiation, the apparatus comprising support means having a substantially plane support surface for supporting said object, means for applying a layer of said powder material to said support surface and radiation means for selectively exposing said powder material to electromagnetic radiation at places corresponding to said object, said applying means comprising a receptacle for said powder material, said receptacle being disposed above said support surface and having a bottom side facing said surface, an outlet aperture provided in said bottom side and having an aperture width, means for displacing said receptacle across said surface and substantially parallel thereto and means for adjusting said aperture width of said outlet aperture.

12. A method of layerwise producing a three-dimensional object, said method comprising generating a layer of a powder material which comprises powder particles and is solidifiable by exposure to electromagnetic radiation, solidifying said layer by selective exposure to electromagnetic radiation at places corresponding to said object and generating an electric field for reducing the charge differences between said powder particles, wherein said step of generating a layer of powder material and selectively solidifying said layer are repeated until the three-dimensional object is formed.

13. The method of claim 12, comprising generating said electric field during the entire production process.

14. The method of claim 12, comprising generating said electric field only during the step of generating said layer of powder material.

15. The apparatus of claim 6, wherein said applying device comprises an outlet aperture extending transversely across said surface, wherein said aperture width is less than ten times the average particle diameter of said power material.

* * * * *

UNITED STATES PATENT AND TRADEMARK OFFICE
CERTIFICATE OF CORRECTION

PATENT NO. : 6,136,257

DATED : October 24, 2000

INVENTOR(S) : Bernhard Graf; Thomas Mattes; and Lutz Reichmann

It is certified that error appears in the above-identified patent and that said Letters Patent is hereby corrected as shown below:

ON THE TITLE PAGE
Item

[30]   Foreign Application Priority Data

Fed Rep Germany    198 13 742.7

Signed and Sealed this

Eighth Day of May, 2001

Attest:

NICHOLAS P. GODICI

Attesting Officer      Acting Director of the United States Patent and Trademark Office